Aug. 6, 1935.  J. ASKIN  2,010,504
LIQUID COOLING AND DISPENSING DEVICE
Filed May 13, 1933   2 Sheets-Sheet 1

Inventor
JOSEPH ASKIN
Albert R. Henry
Attorney

Aug. 6, 1935.  J. ASKIN  2,010,504
LIQUID COOLING AND DISPENSING DEVICE
Filed May 13, 1933   2 Sheets-Sheet 2

Inventor
JOSEPH ASKIN
Albert R. Henry
Attorney

Patented Aug. 6, 1935

2,010,504

UNITED STATES PATENT OFFICE 2,010,504

LIQUID COOLING AND DISPENSING DEVICE

Joseph Askin, Buffalo, N. Y., assignor to Fedders Manufacturing Company, Inc., Buffalo, N. Y.

Application May 13, 1933, Serial No. 670,898

1 Claim. (Cl. 62—141)

This invention relates to liquid dispensing devices, and it has special reference to the continuous cooling thereof during operation.

The invention is particularly directed to the cooling of water in fountains, bubblers or similar devices where but a small portion of the water dispensed is consumed by the user. In this device, means are provided in a specially devised unit, both to cool the water which is directed to the bubbler and to utilize the waste volumes of water, which ordinarily have been directed to a drain, to cool the incoming and relatively warm volumes of water. By such means the energy required to cool the waste volume of water is partially recovered as a regenerative or secondary cooling effect is attained, and thus the cost of refrigerating a device of this nature is considerably reduced. Structurally, it will be found that the device, together with the refrigeration means therefor, is formed as an extremely compact unit, which may be inserted in a cabinet or container of reasonably small dimensions.

The invention further resides in additionally utilizing the cold waste water as a means for aiding in the cooling of a refrigerant condenser after it has performed the functions above mentioned, so that substantially the entire body of cooled water which is not consumed is subjected to a heat exchange action prior to direction into a drain.

Other features of the invention including a novel cabinet and compartment structure, are more specifically described in the accompanying specification and drawings, wherein.

Figure 1:
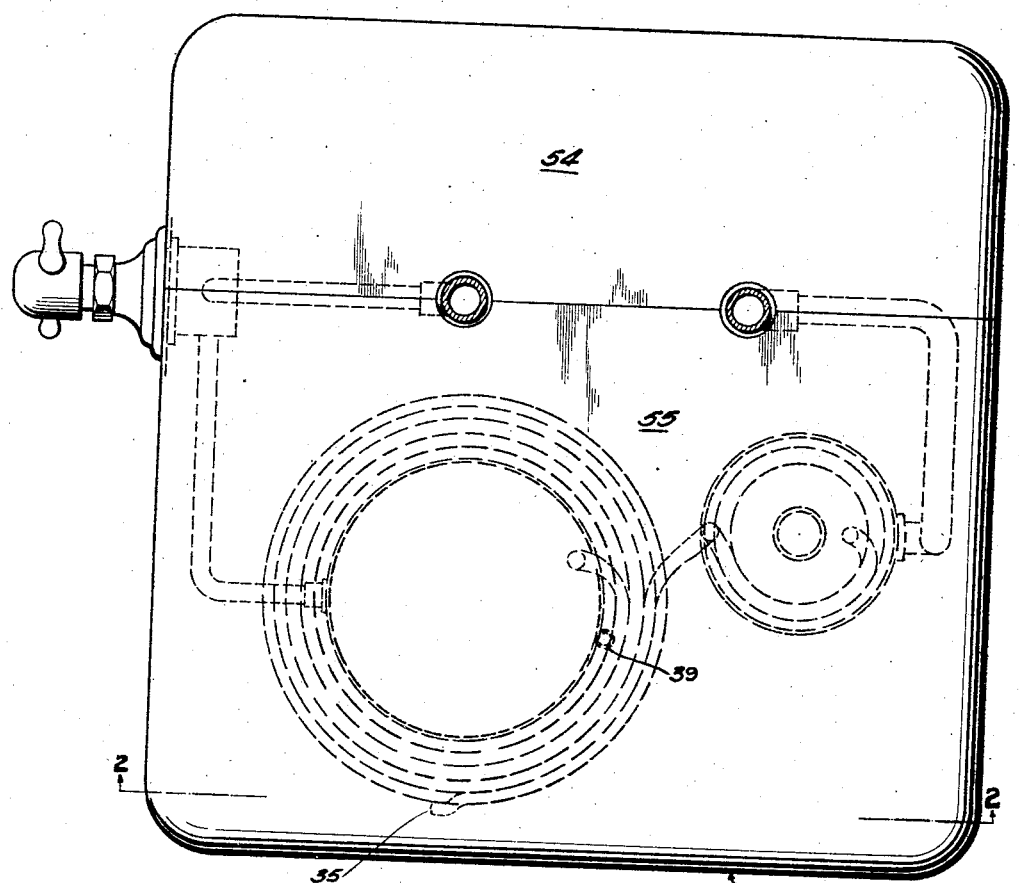
Fig. 1 is a top view of the device with the bubbler removed to show the underlying cabinet arrangement.

In the present invention, water obtained from a source of pressure, such as a city service line 10, is directed through a unit for cooling, and it is dispensed under control of a manually operable valve 11 through a bubbler 12 for consumption. Portions of the device referring to the cabinet and compartment structure will be hereinafter described, and the following description will be chiefly directed to the tank and coil structure and their particular circuits.

The water from the supply pipe 10 is directed first to a helical coil 15 through a connecting conduit 16. The coil 15 is jacketed by a tank 17, the functions of which are hereinafter more fully set forth, and the upper or outlet extremity 18 of the coil 15 is connected to a second coil 19, the output extremity 21 of which supplies a tank or reservoir 22. The reservoir, in turn, is connected to the valve 11 by an outlet conduit 23 and thence the water is directed through a conduit 25 into the serving nozzle 24 of the bubbler 12 to complete the supply circuit.

The coil 19 and the reservoir 22 are associated with a cooling unit 26 of a refrigeration system in the following manner; the reservoir 22 is utilized as a winding base for alternate layers of refrigerant tubing 27 and the water tubing forming the coil 19. The first, third and fifth layers 29, 31 and 33 respectively comprise planar windings of the refrigerant tubing 27, and the second and fourth layers 34 and 35 comprise a return winding of the coil tubing 19, the extremity 21 of which extends into the tank 22 as previously mentioned. It will be noted that the contacting portions of the refrigerant and water coil tubing are flattened in cross-section so that a good thermal contact is obtained therebetween, resulting in a heat exchange between the water tubing and the refrigerant tubing. Likewise, the first layer 29 of refrigerant tubing engages the reservoir 22 and co-operates to retain the water therein at a constant temperature, the water in the reservoir thus providing a holdover supply in cases of heavy demands on the system.

Figure 2:
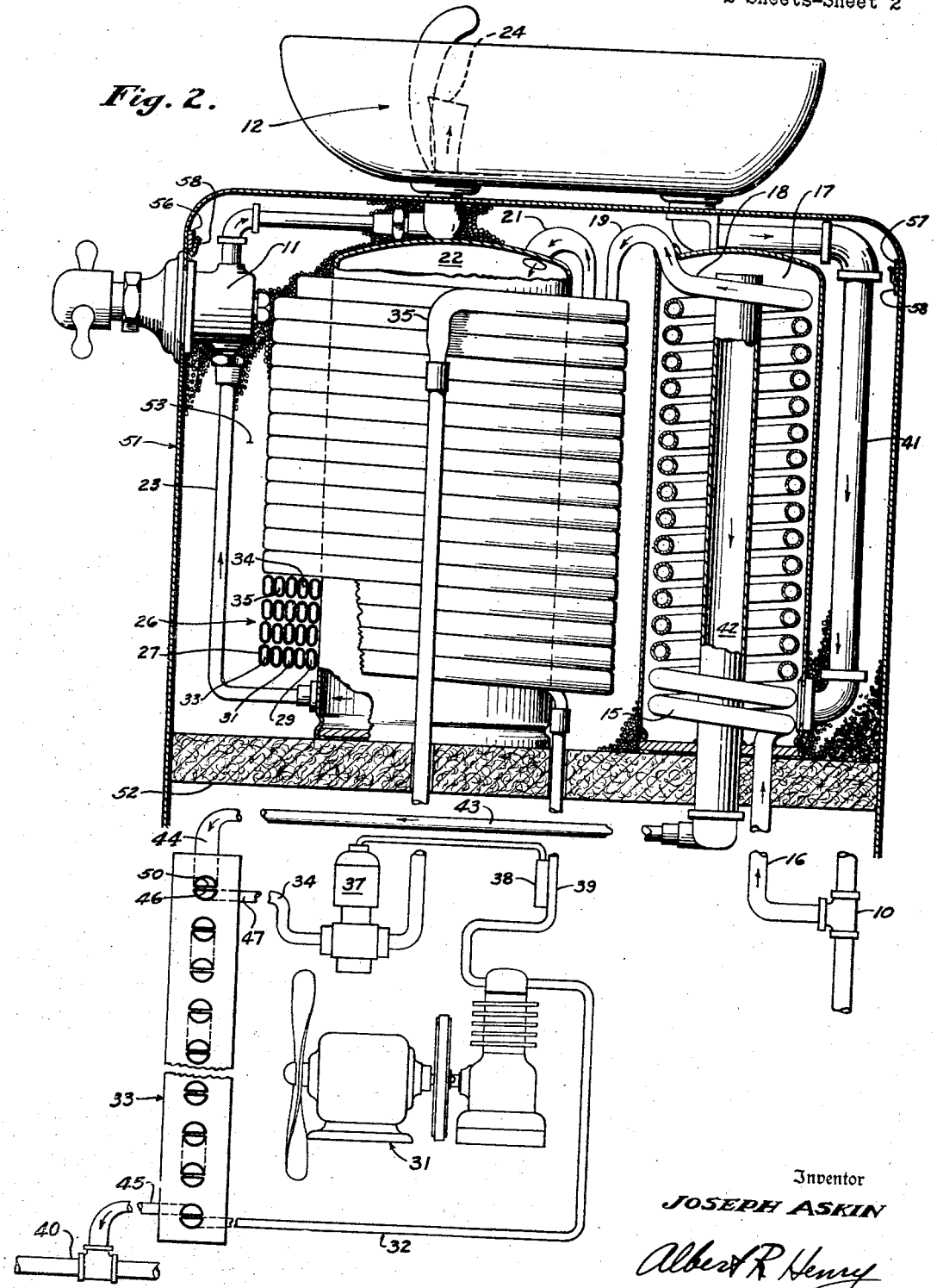
Fig. 2 is a section on the line 2—2 of Fig. 1 wherein portions of the tank structures are broken away to show their relative cross-sectional arrangement.

In Fig. 2, a refrigerant system for supplying the cooling unit 26 is diagrammatically illustrated, and it comprises the usual motor-compressor unit 31, the outlet pipe 32 of which leads to a condenser 33 of special form, which is hereinafter more fully described, and thence the refrigerant is directed through a conduit 34 to the input end 35 of the refrigerant tube 27. A thermostatic expansion valve 37 is interposed in the conduit 34, and it is controlled by the usual expansion bulb 38 secured in intimate thermal contact with the output conduit 39 of the refrigerant tube 27. The output conduit is directed back to the compressor to complete the refrigerant circuit.

Figure 3:
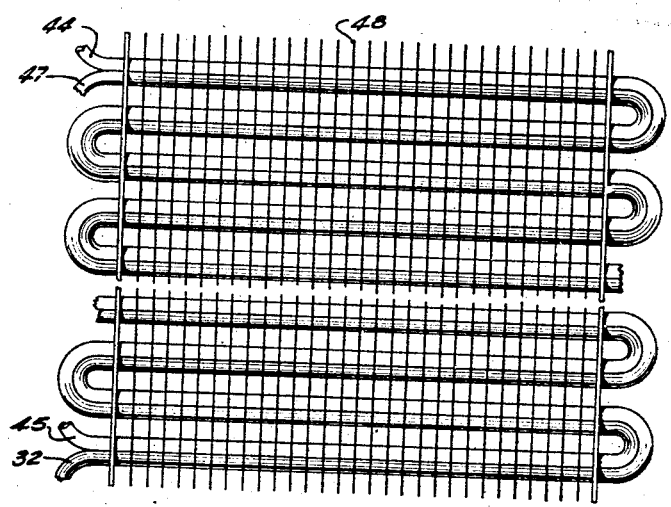
Fig. 3 is a diagrammatic front view of a condenser structure utilized in the present invention.

The waste water from the bubbler 12 is directed through a pipe 41 to the tank 17, which it retains in filled condition by means of an overflow pipe 42 mounted vertically therein. The overflow pipe extends through the bottom of the tank 17 and communicates with a conduit 43, which in turn is connected to a length of half-round tubing 44, the free extremity 45 of which leads to a drain pipe 46 or the like. As shown in Figs. 2 and 3, the tube 44 is mounted with its flat side 50 in intimate engagement with the flat side 46 of a length of tubing 47 forming the condenser 33. The tubes 44 and 47, thus associated, may be wound or bent in any fashion to form an efficient condenser structure, but it is preferred that they be bent as shown in Fig. 3 to form a return bend structure whereon a plurality of fins 48 are soldered in heat exchange relation.

In devices of the described nature, it is usual to isolate the motor-compressor-condenser unit from the remainder of the device, and herein such remaining portions of the device are shown as mounted in a cabinet 51 having an insulated bottom wall 52 forming a mounting base for the tank 17 and reservoir 22. The compartment 53 thus formed within the cabinet is filled with mineral wool, cork, or a like material to insulate the cooled units therein from the walls of the cabinet and the atmosphere. The bubbler 12 will thus protrude through the open top of the cabinet, and a two-piece removable cover structure is provided to conceal the underlying units and the packing material. This cover structure is split on the line of the fittings to clear the connections of the bubbler and thus to form cover portions 54 and 55, both of which are provided with depending flange portions 56 and 57, respectively, which are engageable in receiving flanges 58, secured to the interior of the cabinet 51. It is preferred that the valve device 11 be secured to the side wall of the cabinet so that only the necessary elements of the devices are visible to the public.

During normal operation of the usual bubbler device, it has been found that over 75% of the water directed therethrough is returned to waste, and that, consequently, most of the energy devoted to cooling the water is wasted. In the present device, the incoming water in the coil 15 is continuously precooled as it is submerged in the cold waste water from the bubbler 12. This results in a recovery of much of the waste energy expended in cooling the waste water. However, during more severe periods of operation, much of the cooled waste liquid escapes through the pipe 43 without absorbing its full quota of heat. By directing the partially used waste water from the tank 17 to cool the condenser 33, a further economy is effected and the water, which would normally go to waste in a cooled condition, is required to reabsorb substantially all the heat which has been removed from it.

It is intended that the particular types of coils, tanks and condenser be construed as exemplary for the purposes of description except as pursuant to the following claim.

I claim:

A liquid cooling device comprising a pair of liquid conveying coils, means connecting the coils in series, the free extremity of one of said coils being connected to a source of liquid under pressure, a bubbler connected to the free extremity of the remaining coil, an evaporator device comprising a length of tubing adapted to be connected in a refrigerant circuit, a reservoir interposed in the connection between the second coil and the dispenser, said reservoir serving as a winding base for said second coil and said refrigerant tubing which are wound thereabout in alternate layers to provide a heat exchange device, a drain for the waste liquid from the bubbler, and a tank enclosing said first coil and interposed between the bubbler and drain for directing the waste liquid about said first coil for heat exchange therewith.

JOSEPH ASKIN.